United States Patent
McClelland et al.

(10) Patent No.: US 12,418,218 B2
(45) Date of Patent: Sep. 16, 2025

(54) STATOR FOR A ROTATING ELECTRICAL MACHINE

(71) Applicant: Moteurs Leroy-Somer, Angouleme (FR)

(72) Inventors: Michael Leo McClelland, Champniers (FR); Eric Coupart, Angouleme (FR); Thierry Chassara, Balzac (FR)

(73) Assignee: Moteurs Leroy-Somer (FR)

( * ) Notice: Subject to any disclaimer, the term of this patent is extended or adjusted under 35 U.S.C. 154(b) by 237 days.

(21) Appl. No.: 17/987,201

(22) Filed: Nov. 15, 2022

(65) Prior Publication Data

US 2023/0155454 A1  May 18, 2023

(51) Int. Cl.
| | |
|---|---|
| *H02K 9/19* | (2006.01) |
| *H02K 1/20* | (2006.01) |
| *H02K 5/15* | (2006.01) |
| *H02K 5/20* | (2006.01) |
| *H02K 9/06* | (2006.01) |
| *H02K 9/197* | (2006.01) |

(52) U.S. Cl.
CPC ............... *H02K 9/197* (2013.01); *H02K 1/20* (2013.01); *H02K 5/15* (2013.01); *H02K 5/20* (2013.01); *H02K 9/06* (2013.01)

(58) Field of Classification Search
CPC .......... H02K 9/08; H02K 9/197; H02K 5/203; H02K 9/06; H02K 5/20; H02K 3/44
See application file for complete search history.

(56) References Cited

U.S. PATENT DOCUMENTS

| | | | | |
|---|---|---|---|---|
| 1,882,487 | A * | 10/1932 | Dupont | H02K 9/06 310/216.011 |
| 5,698,925 | A * | 12/1997 | Coupart | H02K 5/207 310/216.011 |
| 6,954,010 | B2 * | 10/2005 | Rippel | H02K 1/20 310/216.014 |
| 11,101,713 | B2 * | 8/2021 | Okubo | H02K 9/06 |
| 2002/0027396 | A1 * | 3/2002 | Hein | H02K 3/505 310/64 |
| 2005/0174007 | A1 * | 8/2005 | McClelland | H02K 5/1732 310/90 |
| 2006/0226717 | A1 * | 10/2006 | Nagayama | H02K 9/06 310/58 |
| 2012/0080982 | A1 * | 4/2012 | Bradfield | H02K 9/00 310/60 A |
| 2012/0080983 | A1 * | 4/2012 | Iund | H02K 1/20 310/60 A |

(Continued)

FOREIGN PATENT DOCUMENTS

| | | |
|---|---|---|
| EP | 3511223 A1 | 7/2019 |
| WO | 95/35592 A1 | 12/1995 |
| WO | 2021/018831 A1 | 2/2021 |

*Primary Examiner* — Oluseye Iwarere
*Assistant Examiner* — Masoud Vaziri
(74) *Attorney, Agent, or Firm* — Jason A. Smith; Shumaker, Loop & Kendrick, LLP (57) ABSTRACT

A rotary electric machine includes a stator housed in a housing, the stator having a stator body formed by a stack of stator laminations, the laminations are generally non-circular and being angularly offset with respect to each other, so as to form spaces with the housing, the housing having ducts for the flow of a coolant, and said spaces also being used for the flow of the coolant.

22 Claims, 7 Drawing Sheets

(56) References Cited

U.S. PATENT DOCUMENTS

| | | | | |
|---|---|---|---|---|
| 2012/0267970 | A1* | 10/2012 | Filip | H02K 5/203 |
| | | | | 310/54 |
| 2013/0168964 | A1* | 7/2013 | Xu | H02K 3/44 |
| | | | | 290/52 |
| 2013/0278091 | A1* | 10/2013 | Ohashi | H02K 9/197 |
| | | | | 310/58 |
| 2015/0207388 | A1* | 7/2015 | Sugimoto | H02K 5/203 |
| | | | | 310/54 |
| 2016/0301286 | A1* | 10/2016 | Salter | H02K 9/10 |
| 2016/0380490 | A1* | 12/2016 | McClelland | H02K 7/14 |
| | | | | 310/58 |
| 2018/0358849 | A1* | 12/2018 | Saint-Michel | H02K 7/14 |
| 2019/0280536 | A1* | 9/2019 | Niijima | H02K 1/20 |
| 2020/0398871 | A1* | 12/2020 | Kueter | B61F 3/14 |
| 2021/0305876 | A1* | 9/2021 | Vanhee | H02K 9/19 |
| 2022/0140697 | A1* | 5/2022 | Pawar | H02K 1/20 |
| | | | | 310/53 |
| 2022/0271580 | A1* | 8/2022 | Waider | H02K 1/20 |
| 2022/0294305 | A1* | 9/2022 | Neidhardt | H02K 9/22 |

* cited by examiner

STATOR FOR A ROTATING ELECTRICAL MACHINE

TECHNICAL FIELD

The present invention relates to rotary electric machines and more particularly to cooling such machines. They can be electric generators or electric motors.

BACKGROUND

International application WO 95/35592 and patent U.S. Pat. No. 5,698,925 relate to open machines comprising stator laminations angularly offset with respect to the following adjacent lamination. These machines are cooled with an air flow.

WO 2021/018831 discloses a stator comprising laminations in which cooling passages are formed, axially connected to the connection channels of a device for introducing coolant. This device is integrally moulded with the housing.

US 2012/080983 discloses a stator body comprising helical passages allowing a coolant to flow between a coolant inlet and a coolant outlet.

US 2012/267970 also discloses an electric machine comprising a stator body forming channels for the flow of coolant between a coolant inlet and a coolant outlet situated on the housing.

U.S. Pat. No. 1,882,487 discloses an air-cooled machine comprising polygonal stator laminations that are offset in order to create ventilation ducts.

EP 3 511 223 discloses a machine comprising coolant ducts.

There is a need to improve the cooling of such machines.

SUMMARY OF THE INVENTION

The invention thus relates, according to one aspect thereof, to a rotary electric machine, comprising a stator housed in a housing,
 the stator comprising a stator body formed by a stack of stator laminations, the laminations of the stator being generally non-circular and being angularly offset with respect to each other, so as to form spaces with the housing,
 the housing comprising ducts for the flow of a coolant, and said spaces also being used for the flow of the coolant.

The coolant can flow in the housing, in particular in the ducts thereof provided to this end, and between the housing and the stator body, in the spaces formed between the housing and the laminations.

Due to the invention, it is possible to optimize the cooling of the electric machine while substantially increasing the passage of the magnetic flux and reducing manufacturing costs.

Such machines cooled by a flow of coolant can be referred to as closed machines. They are not cooled directly by the ambient air, but by a coolant, generally in liquid form, flowing within a housing in physical contact with the stator, which it cools.

In a machine with a closed coolant flow, the coolant flow does not leave the machine. Such a closed machine can also be additionally cooled by an air flow.

Such a flow can be sealed. Sealing can be obtained by a sealed closure between the housing and the stator body. This sealing can be obtained by means of resin and/or by the addition of special parts, preferably heat-conducting, around the end of the winding.

The interface between the stator body and the housing makes it possible to promote improved heat exchanges with the coolant. The laminations themselves can also be used to reject heat. In addition, the angular offset of the laminations can make it possible to increase the contact area between the laminations and the coolant, and thus promote heat exchanges with the coolant. The method for assembling the laminations of the stator makes it possible to ensure a seal between each lamination.

Preferably, the ducts extend parallel to the axis of the machine. Preferably, the ducts extend over at least part, preferably most, of the length of the stator body. The ducts can extend over the entire length of the stator body. Preferably, the ducts are straight.

Preferably, the ducts are situated radially outside the stator body, in particular outside the spaces formed between the stator body and the housing for the flow of coolant.

The machine preferably comprises at least one end flange comprising passages for the flow of a coolant. Said flow in the flange is preferably in fluid communication with the ducts of the housing. The coolant flows in a closed circuit between the flange and the ducts.

Laminations

The laminations can be offset one by one or, as a variant, in groups of two or more laminations. The groups can comprise two laminations or more than two laminations.

The laminations offset with respect to each other are not exactly superposed as a result of the angular offset.

The laminations can be offset by an angle $\alpha$, which can be constant from one lamination to another or from one group of laminations to another. The measurement of this angle can be substantially different from a multiple of 45°. The measurement of this angle $\alpha$ can be a fraction of a multiple of 360° and this measurement can also be selected so that this measurement of the angle, expressed in degrees, is a multiple of 360/N, where N is the number of slots of the stator, in order to obtain stator slots aligned in a straight line along the axis of rotation.

As a variant or additionally, the angular offset can depend on the polarity of the machine.

Despite the staggered arrangement of the laminations of the stator body, such a configuration makes it possible to ensure that the slots of the stator remain correctly aligned with each other.

As a variant, the angle can be slightly different from a multiple of 360°/N, in particular when the creation of a slight inclination of the stator slots is sought with respect to the axis of rotation of the motor, the aim being to reduce the variation of the motor torque over one revolution. Typically, the alignment offset of the slots between each lamination can make it possible to obtain an angular offset between the first and last laminations of the stator of less than twice 360°/N, preferably once 360°/N. In this preferred case, if a stator consists of a stack of n laminations, the angular offset of the slots between each lamination could be a multiple of $(360°/N*(1+1/n))$.

In addition, due to the invention, the total footprint of the machine can be reduced.

If applicable, the assembly of the laminations of the stator body can advantageously be automated.

Finally, due to the arrangement of the laminations, thin laminations can be used without affecting the strength of the stator, which makes it possible to improve the magnetic performance of the machine.

The laminations can be substantially polygonal, in particular based on a regular polygon, for example square or hexagonal. The laminations thus have straight sides, for example four straight sides, or six as a variant. Variants can exist with non-straight shapes.

The laminations can have truncated corners, in particular within an arc-shaped outline. The arc can be centred on the axis of rotation of the machine. The radius of the arc can be the same for each corner of a lamination and for all of the laminations of the stator body.

Each lamination can for example have four truncated corners, or six or more as a variant.

For each corner of the laminations, the radius of the arc can be substantially greater than the radius of the circle geometrically inscribed in the square perimeter of the laminations. In addition, this radius is sufficiently small so that on any two consecutive laminations, the corresponding arcs continue on from each other or are superposed and form a substantially continuous arc in an axial view of the stator, that is, when projected in a plane perpendicular to the axis of rotation of the machine.

The laminations of the stator body can be connected to at least one adjacent lamination, or to each of the two adjacent laminations, by a weld bead. The weld bead can in particular be formed on at least one of the truncated corners of the laminations, for example every other truncated corner. Such a configuration makes it possible to improve the holding of the laminations and mechanically strengthen the structure of the stator body.

The number of weld beads can be a multiple of 360/N, where N is the number of slots of the stator.

It is possible to obtain continuous weld beads in certain angular configurations. In one embodiment, the number of weld beads can for example be 8, every 45°, for a stator with 72, 48, 36 or 24 slots. For a stator with a number of slots not divisible by 4, such as for example a stator with 54 slots, a continuous line can only be found on a diameter close to the magnetic diameter of the motor or by adding outer slots to achieve a common diameter on certain rows for all of the lamination positions.

The laminations of the stator body can be covered with a protective coating, in particular a lacquer or an adhesive. Such a coating makes it possible to prevent any risk of corrosion of the laminations, in particular due to contact with the coolant. The exterior surface of the laminations of the stator body is thus satisfactorily protected from corrosion.

In one variant embodiment, the laminations can be adhesively bonded to each other. The adhesive can preferably be applied uniformly.

In addition, the coating of the laminations can make it possible to ensure satisfactory sealing between the laminations, and prevent any leaking of coolant towards the rotor, through the stator, and in particular between the laminations.

One variant embodiment can consist of melting a coating deposited in advance on the laminations. One variant embodiment can consist of dipping the entire lamination stack in a liquid followed by drying or polymerization, or of spraying on a coating.

Housing

The housing can comprise an exterior sleeve and an interior sleeve inside which are formed the ducts for the coolant, or a single exterior sleeve, the coolant flowing between the stator body and the exterior sleeve.

The housing can be produced by moulding, by pressure-injection of a light metal or a plastic reinforced with fibres, or as a variant, from a cut, rolled, welded and/or stamped metal sheet.

The coolant can be glycol water. As a variant, the coolant can be selected from the following non-limiting list: any type of oil for a reducer or combustion engine, or brake fluid, for example.

The stator can comprise a winding, which can be positioned on teeth of the magnetic lamination stack. The winding can comprise coils, each coil being positioned on a tooth, in which case the winding is referred to as "concentrated". As a variant, the coils can surround a plurality of consecutive or non-consecutive teeth, in which case the winding is referred to as "distributed". As a further variant, the winding can comprise U- or I-shaped pins.

The stator winding can be embedded in resin.

The resin can be selected from the following non-limiting list: epoxy, polyurethane, multiple-component resins, with or without powder or fibre fillers that improve the desired performance, for example to improve heat transfer, resistance in a given temperature range, the occurrence of partial discharges or mechanical strength and sealing. The resin can be selected so that its weight only has a moderate impact on the total weight of the machine. The resin can be selected so that its glass transition temperature is compatible with the maximum temperature of the machine, in order to avoid an excessive increase in the expansion coefficient of the winding overhangs.

The presence of resin can also make it possible to reduce the vibration resistance.

In addition, the resin coating the winding can also close the spaces between the stator body and the housing, and thus ensure that it is sealed and prevent any leaking of coolant.

In one embodiment, the winding is completely coated in the resin.

As a variant, it is possible for the winding not to be completely coated in the resin, in particular a part of the winding facing the rotor and furthest from a central plane of the machine, perpendicular to the axis of rotation. This part of the winding can remain exposed to a gas present in the machine, in particular exposed to a cooling gas that will be described hereinafter.

The machine can comprise a conductive ring, in particular made from aluminium, positioned between the stator winding and the housing. The conductive ring can make it possible to promote heat conduction between the winding and the housing, and thus make it possible to improve the heat rejection produced in the stator winding.

In addition, the conductive ring can make it possible to promote the sealing of the coolant flow, and prevent leaks towards the winding.

The conductive ring can have a reduced thickness, so as to leave space to accommodate a circuit forming a passage for the coolant around the winding, as described below.

The machine can comprise an insulating plate positioned between the conductive ring and the winding. This is electrical insulation.

The machine can comprise a separating liner, positioned between the stator winding and the rotor. This separating sleeve can be fastened to the stator. It can be placed in the air gap. It can make it possible to prevent potential leaks towards the rotor, as well as leaks of lubricating oil.

The machine can further comprise at least one circuit forming a passage for the coolant around the winding, in particular level with the winding overhangs. Such a configuration makes it possible to further improve the cooling of the stator winding.

Cooling Using a Cooling Gas

The aforementioned circuit can comprise at least one fin configured to send a cooling gas towards a rotor of the machine. The fin can be integrally moulded with the circuit, or attached thereto. The fin is static when the machine is operating. The fin makes it possible to ensure that heat is exchanged between the cooling gas and the coolant, and thus promote the general cooling of the machine.

The housing can form an interior space of the machine. The interior space of the housing can accommodate the stator and the rotor of the machine.

The interior space of the machine can be configured to be pressurized.

As a variant, the housing can form an interior space that is not pressurized. It can in particular be placed at ambient pressure.

The interior space of the machine can be filled with air, or, as a variant, another ambient gas. The gas present in the interior space of the machine can be, but is not limited to, air, nitrogen or another neutral gas.

The machine can further comprise a rotor. The rotor can be a rotor having permanent magnets, positioned on the surface of a rotor body or inserted circumferentially or radially therein, or positioned in a U-, V- or W-shape, in one or more layers.

As a variant, the rotor can be a wound rotor, or as a further variant it can be a squirrel-cage rotor.

The rotor can comprise a number of poles of between 2 and 78 for example, more than 64 poles, for example, or between 4 and 12, for example 6 or 8.

The rotor can be without any specific cooling system, which can be unproblematic insofar as the heat losses from the rotor can remain low.

As a variant, the rotor can form an interior cooling circuit with at least one delivery passage and one return passage, through which a cooling gas can pass.

The cooling gas can be air or another gas mentioned above, present in the interior space of the machine.

The machine can comprise an inner fan, which is in particular positioned on a shaft of the machine or on the rotor, in particular on one side of the stator and the rotor, in the interior space of the machine. The inner fan allows the cooling gas to flow in the interior space of the machine.

The inner fan can be separate from the rotor, being positioned on the shaft a given distance from the rotor, or as a variant, it can be positioned on the rotor, in particular on a rotor body of the rotor. It can for example comprise fins positioned on an end plate of a rotor body of the rotor.

End Flange

The machine can comprise at least one end flange, or two end flanges. The end flanges are placed at the axial ends of the housing.

At least one flange can comprise passages for the flow of a coolant. Said flow in the flange can be in fluid communication with the ducts of the housing. They can be connected to each other by pipes outside the housing and the flange.

The machine can comprise a single flange comprising passages for the flow of a coolant. The other flange can be without such passages. The flange without passages can be situated on the same side of the stator as the aforementioned fan, and the flange comprising the passages can be situated on the opposite side of the stator.

At least one flange, in particular the flange comprising the passages for the flow of a coolant, can comprise a plate of material for redirecting the cooling gas coming from the delivery passage of the rotor towards the return passage of the rotor. The plate of material can be integrally moulded with the flange, or attached thereto. The plate of material is static when the machine is operating.

The machine can comprise a diffuser insert fastened to the flange, in particular to the flange comprising passages for the flow of a coolant, configured to guide the cooling gas coming from the delivery passage of the rotor towards the plate of material. The diffuser insert can be integrally moulded with the flange, or attached thereto. It can be manufactured by moulding, casting or by additive manufacturing. The diffuser insert is static when the machine is operating.

The cooling gas can be sucked into the return passage of the rotor through the action of the fan situated on the other side of the rotor.

The electric machine can be a motor or a generator.

The machine is not limited to a voltage range or to a type of winding, nor to a power range or a speed range. The machine can for example develop power greater than 100 kW, with a rotation speed greater than 10,000 rpm. The power and speed can of course be lower than these values.

BRIEF DESCRIPTION OF THE DRAWINGS

The invention will be better understood on reading the following detailed description of non-limiting exemplary embodiments thereof, and from examining the appended drawing, in which.

DETAILED DESCRIPTION

In the description hereinafter, identical elements or identical functions have the same reference sign. For the sake of concision, they will not be described with respect to each of the figures, and only the differences between the embodiments will be described. For the sake of clarity, the figures do not always show the actual proportions.

Figure 1:
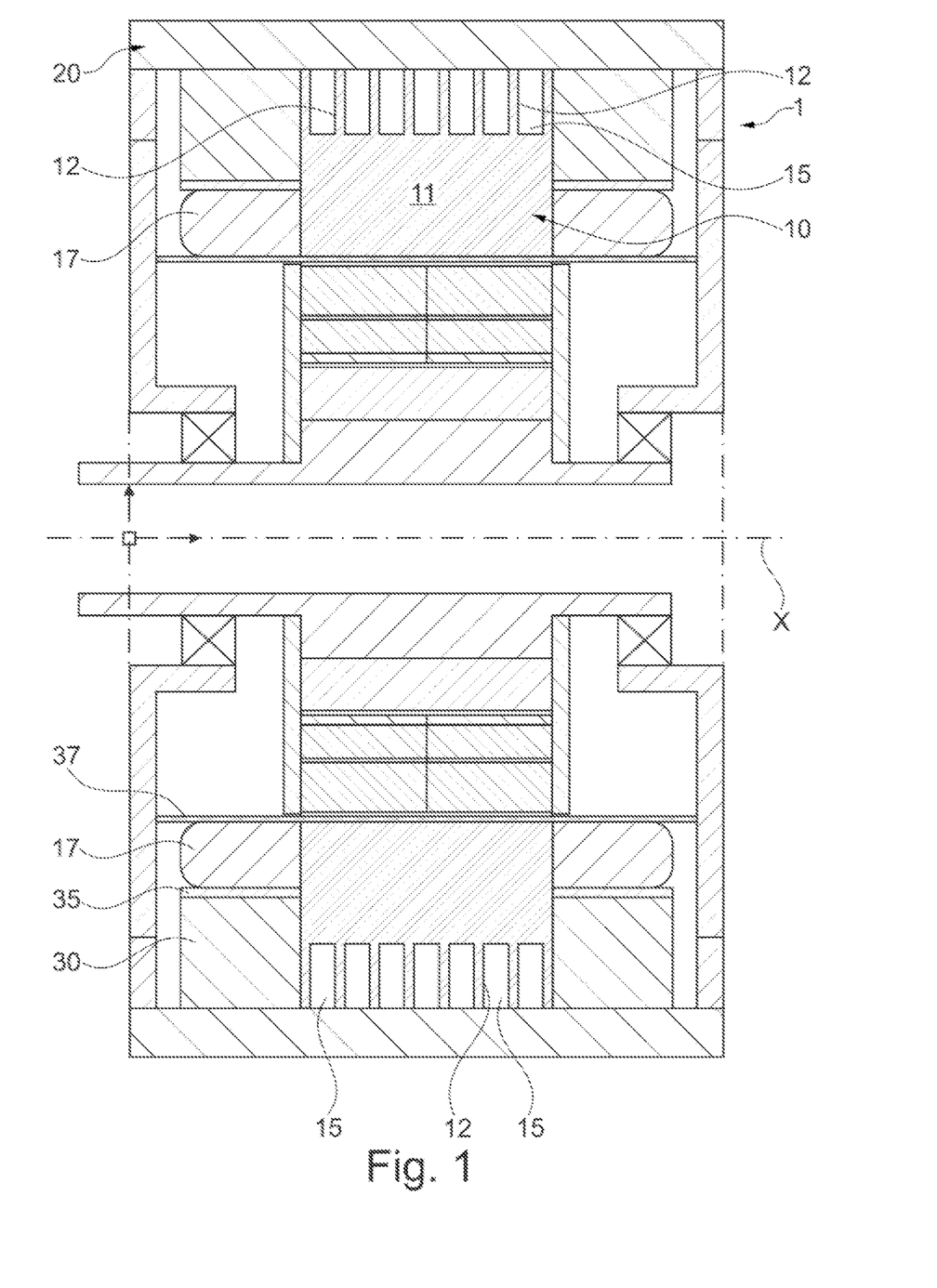
FIG. 1 is a partial schematic longitudinal cross-sectional view of a machine according to the invention.

FIG. 1 shows a first example of a rotary electric machine according to the invention. The machine 1 comprises a rotor 40, a stator 10 and a housing 20 extending along a longitudinal axis X of rotation of the machine. It is cooled by the flow of a coolant.

The housing 20 forms an interior space inside which the stator 10 and the rotor 40 are accommodated. The housing comprises an exterior sleeve 21 and an interior sleeve 22 between which are formed ducts 25 for the coolant. In this example, the coolant is glycol water.

The stator 10 comprises a stator body 11 formed by a stack of stator laminations 12, the laminations 12 of the stator 10 being generally non-circular and angularly offset with respect to each other, so as to form spaces 15 with the housing, as can be seen in FIG. 1.

The laminations can be offset one by one or, as a variant, in groups of two or more laminations. The groups can comprise two laminations or more than two laminations.

Figure 2:
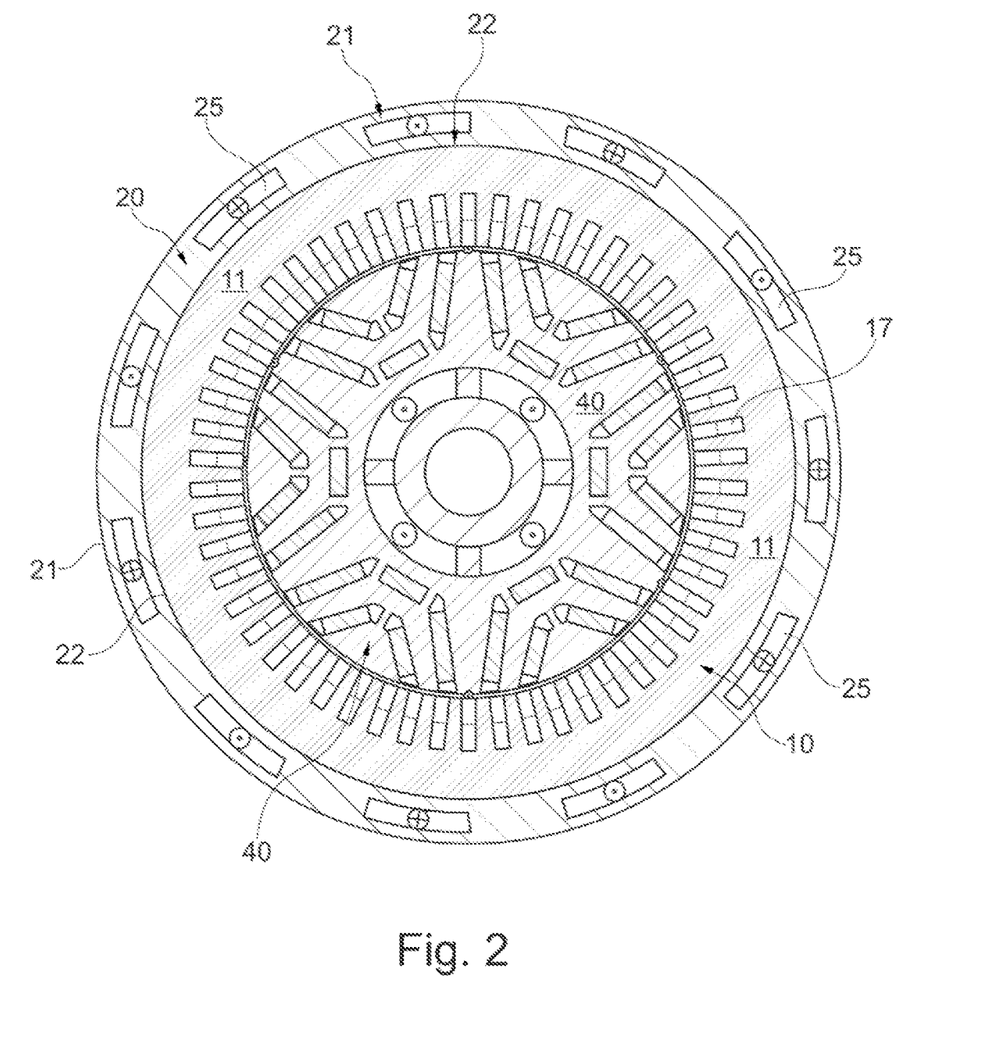
FIG. 2 is a partial schematic transverse cross-sectional view of the machine in FIG. 1.

Despite the staggered arrangement of the laminations of the stator body 11, it is also ensured that the slots of the stator also remain correctly aligned with each other, as illustrated in FIG. 2.

In addition, the laminations 12 are coated with a protective coating, in particular a lacquer or an adhesive, which makes it possible to prevent any risk of corrosion, in particular due to contact with the coolant, and to ensure satisfactory sealing between the laminations, and prevent any leaking of coolant towards the rotor, through the stator, and in particular between the laminations 12.

The spaces 15 of the stator 10 are also used for the flow of the coolant. The coolant can thus flow in the housing 20, in particular in the ducts 25 thereof provided to this end, and between the housing 20 and the stator body 11, in the spaces 15 formed between the housing 20 and the laminations 12.

Such flow is sealed. Sealing can be obtained by a sealed closure between the housing and the stator body.

In addition, the stator comprises a winding 17 embedded in resin.

The machine also includes conductive ring 30, here made from aluminium, positioned between the stator winding 17 and the housing 20, which makes it possible to promote heat conduction between the winding 17 and the housing 20, and thus improve the heat rejection produced in the stator winding. In addition, the conductive ring 30 also makes it possible to promote the sealing of the coolant flow, and prevent leaks towards the winding 17.

The machine also comprises an insulating plate 35 positioned between the conductive ring 30 and the winding 17. This is electrical insulation.

Finally, the machine comprises a separating liner 37 positioned between the stator winding and the rotor, fastened to the stator. This separating liner 37 makes it possible to prevent potential leaks towards the rotor, as well as leaks of lubricating oil.

Figure 3:
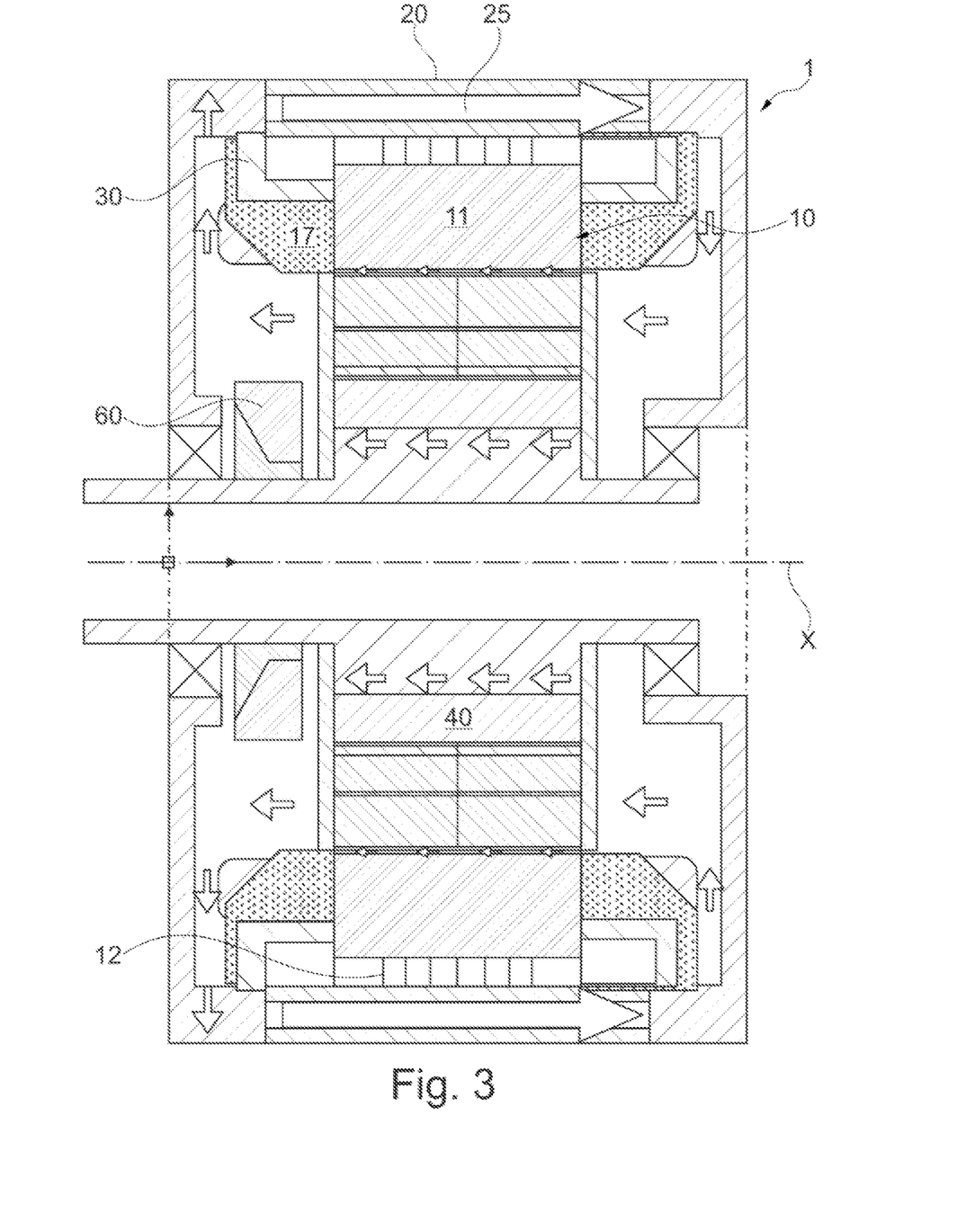
FIG. 3 is a similar view to FIG. 1 of a variant embodiment.
Figure 4:
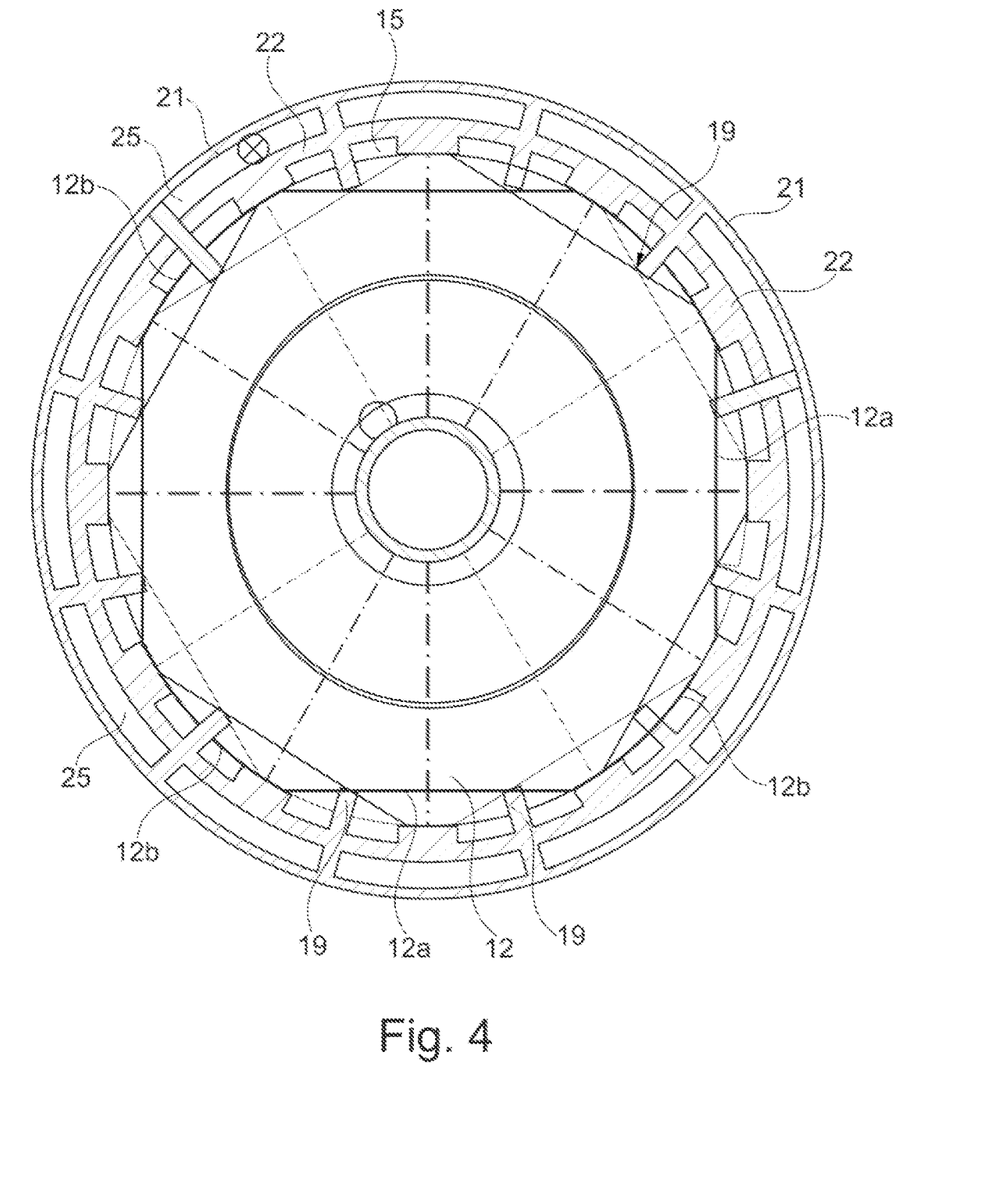
FIG. 4 is a partial schematic transverse cross-sectional view of the machine in FIG. 3.

The resin coating the winding can also close the spaces between the stator body and the housing, and thus ensure that it is sealed and prevent any leaking of coolant, as illustrated in the embodiment in FIGS. 3 and 4.

In the embodiment in FIGS. 3 and 4, the winding is not completely coated in the resin. There is one uncoated part, namely the part of the winding facing the rotor and furthest from a central plane of the machine, perpendicular to the axis of rotation X. This part of the winding can remain exposed to a gas present in the machine, in particular exposed to a cooling gas that will be described hereinafter.

Figure 5:
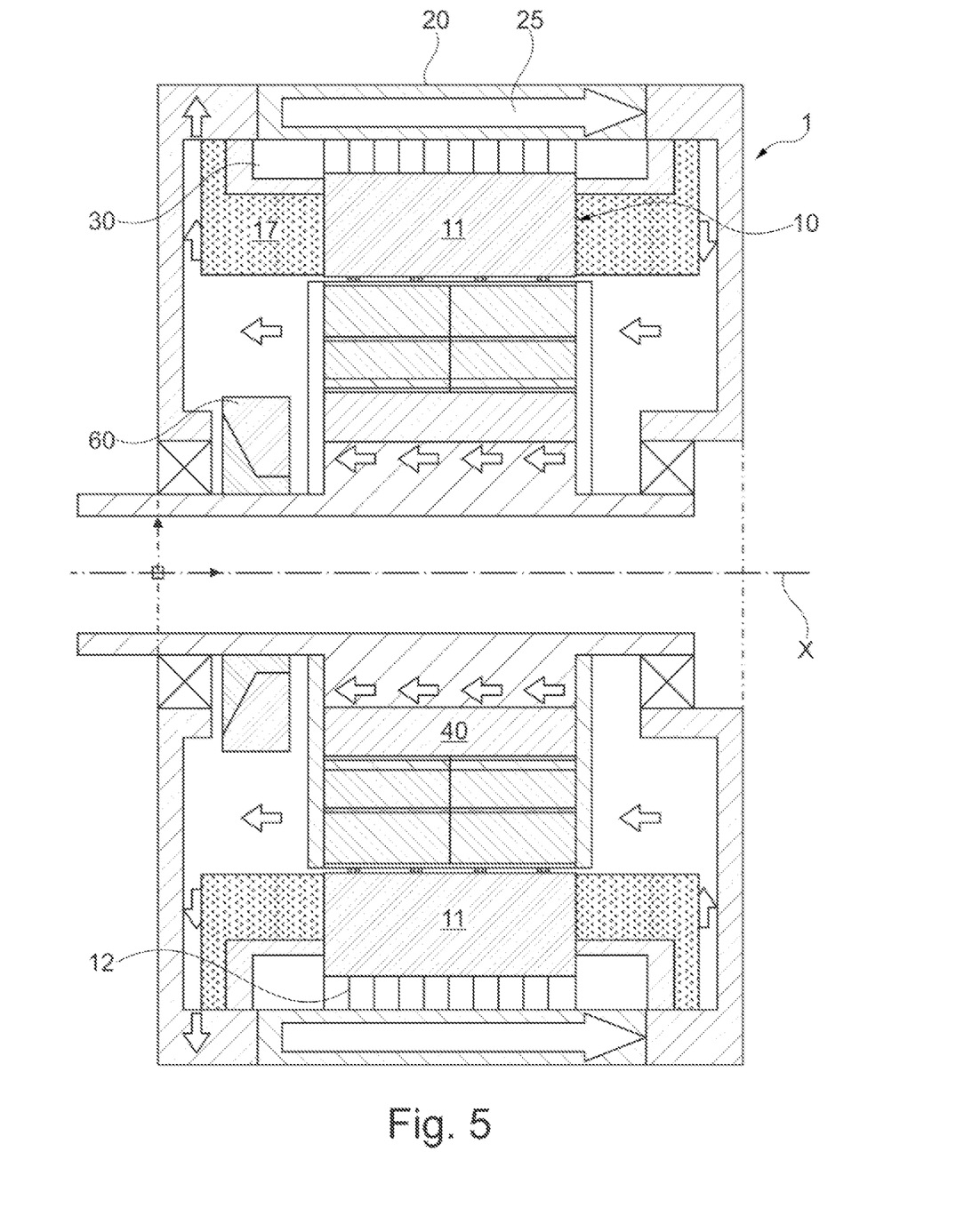
FIG. 5 is a similar view to FIG. 1 of a variant embodiment.

As a variant, as illustrated in FIG. 5, the winding is completely coated in the resin.

In the example in FIGS. 3 and 4, the interior space of the housing is configured to be pressurized. Conversely, in the example in FIG. 5, the housing forms an interior space that is not pressurized. It can in particular be placed at ambient pressure. The interior space of the machine can in particular be filled with air.

In the two examples in FIGS. 3, 4 and 5, the machine comprises an inner fan 60, which is in positioned on a shaft of the machine, at a distance from the rotor 40, on one side of the stator and the rotor, in the interior space of the machine. The inner fan 60 allows the cooling gas to flow in the interior space of the machine.

In addition, in the example described in FIG. 4, the laminations are substantially polygonal, in the shape of a square, with four straight sides 12a, and four truncated corners 12b, which have an arc-shaped outline. The arc is centred on the axis of rotation of the machine. Here, the radius of the arc is the same for each corner of a lamination and for all of the laminations of the stator body.

For each corner of the laminations, the radius of the arc is substantially greater than the radius of the circle geometrically inscribed in the square perimeter of the laminations. In addition, this radius is sufficiently small so that on any two consecutive laminations, the corresponding arcs continue on from each other or are superposed and form a substantially continuous arc in an axial view of the stator, that is, when projected in a plane perpendicular to the axis of rotation of the machine, as can be seen in FIG. 4.

In addition, the laminations of the stator body are connected to each of the two adjacent laminations 12 by weld beads 19, in order to improve the holding thereof and strengthen the structure of the stator body 11. In the embodiment in FIGS. 3 and 4, the weld beads are 12 in number, every 30°, for a 48-slot stator.

Figure 6:
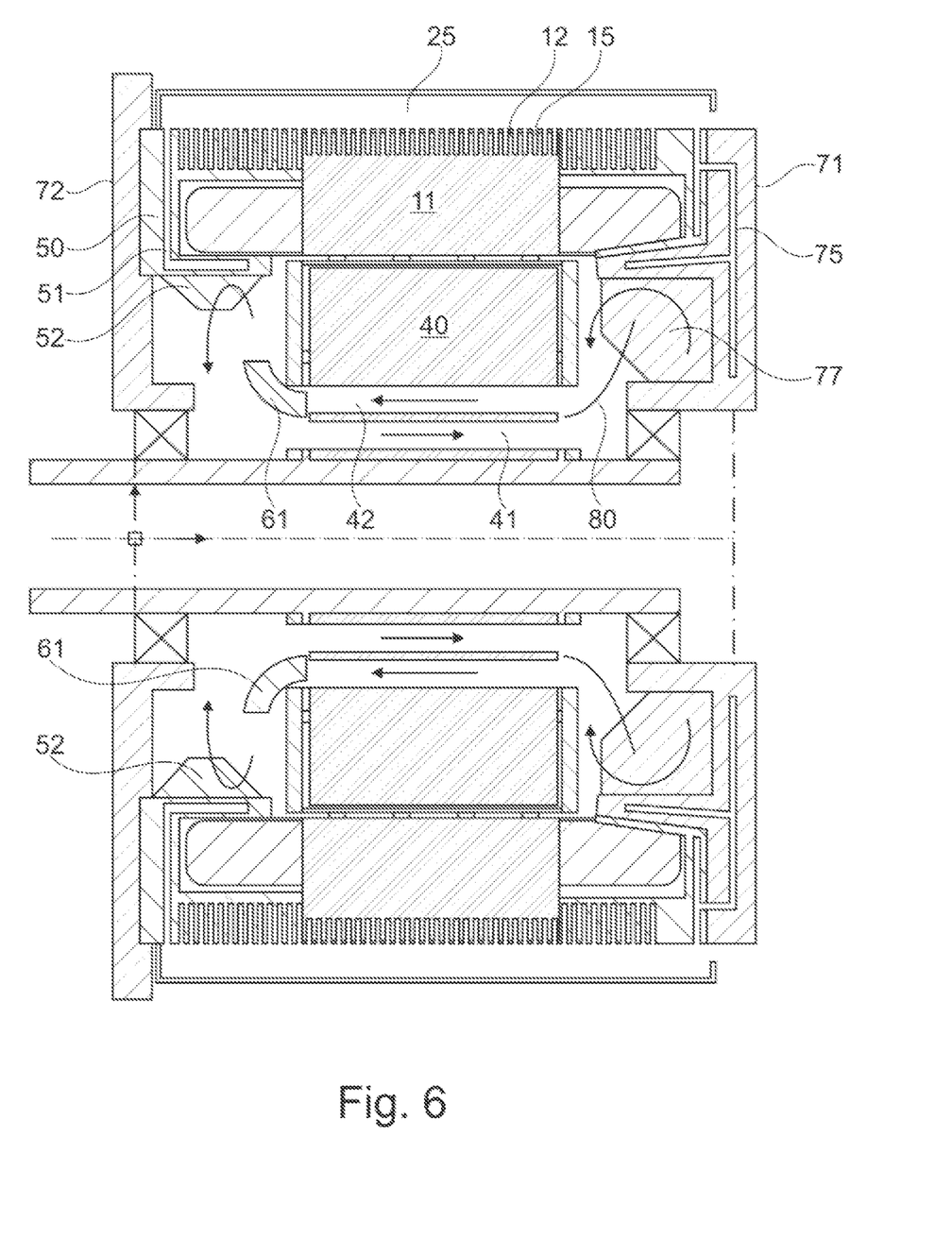
FIG. 6 is a similar view to FIG. 1 of a variant embodiment.
Figure 7:
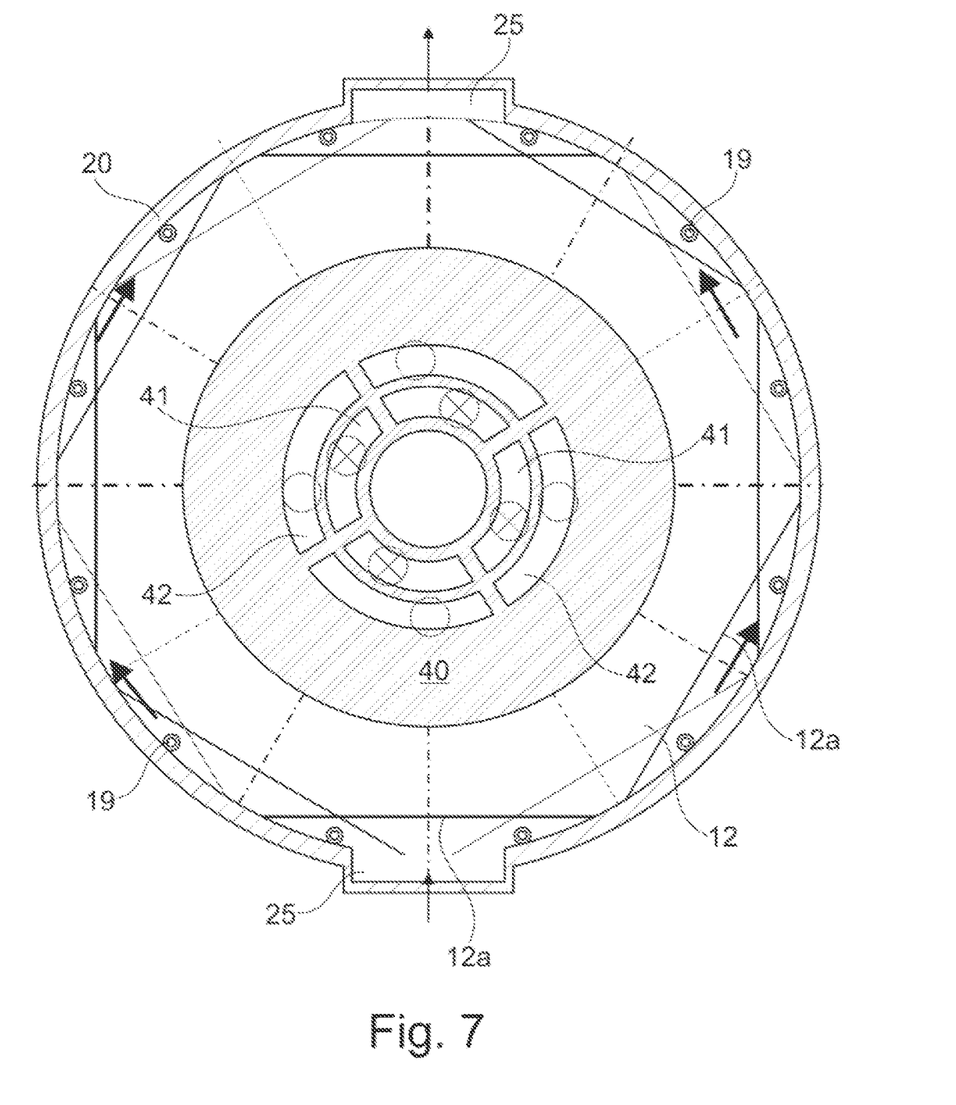
FIG. 7 is a partial schematic transverse cross-sectional view of the machine in FIG. 6.

FIGS. 6 and 7 show another variant embodiment, in which the conductive ring 30 has a reduced thickness, so as to leave space to accommodate a circuit 50 forming a passage 51 for the coolant around the winding 17. This circuit 50 is formed level with the winding overhangs, in order to further improve the cooling of the stator winding.

The circuit 50 also comprises static fins 52, configured to send a cooling gas towards the rotor 40 of the machine. The fins 52 make it possible to ensure that heat is exchanged between a cooling gas and the coolant, and thus promote the general cooling of the machine.

In addition, as illustrated in FIGS. 6 and 7, the machine comprises a rotor 40, forming an interior cooling circuit with delivery passages 41 and return passages 42 through which a cooling gas can pass. The cooling gas can be air.

In this example, the inner fan 60 comprises fins 61 positioned on an end plate of a rotor body of the rotor.

The machine also comprises two end flanges 71, 72 placed at the axial ends of the housing 20.

In this example, the end flange 71 comprises passages 75 for the flow of the coolant. The flow in the flange 71 is in fluid communication with the ducts 25 of the housing 20, as illustrated.

The other flange 72 is without such passages. The flange 72 without passages is situated on the same side of the stator as the fins 61 of the fan 60, and the flange 71 comprising the passages 75 is situated on the opposite side of the stator.

The flange 71 comprising the passages 75 for the flow of the coolant also comprises a static plate of material 77 for redirecting the cooling gas coming from the delivery passage 41 of the rotor towards the return passage 42 of the rotor.

Finally, the machine comprises a static diffuser insert 80, fastened to the flange 71 comprising the passages 75, configured to guide the cooling gas coming from the delivery passage 41 of the rotor towards the plate of material 77.

The cooling gas can be sucked into the return passage 42 of the rotor through the action of the fan 60 situated on the other side of the rotor.

The invention is not limited to the examples that have just been described.

In particular, the housing can be a different shape, for example square, hexagonal or octagonal.

The stator can comprise a different number of ducts, for example between 2 and 200.

The invention claimed is:

1. A rotary electric machine, comprising:
 a stator housed in a housing, the stator comprising a stator body formed by a stack of stator laminations, the laminations being generally non-circular and being angularly offset with respect to each other, so as to form spaces with the housing, the housing comprising ducts for the flow of a coolant, and said spaces also being used for the flow of the coolant, wherein the ducts comprise at least a portion that is situated radially external to the stator body and that is open radially towards the stator body, the portion being at least partially closed in a radial direction from an outside of the machine by a lateral wall of the housing.

2. The machine according to claim 1, wherein the laminations are substantially polygonal.

3. The machine according to claim 2, wherein the laminations have truncated corners.

4. The machine according to claim 1, wherein the laminations of the stator body are coated with a protective coating.

5. The machine according to claim 1, wherein the coolant is glycol water.

6. The machine according to claim 1, wherein the stator comprises a winding embedded in resin.

7. The machine according to claim 6, wherein a part of the winding facing a rotor and furthest from a central plane of the machine, perpendicular to the axis of rotation, is not coated in the resin.

8. The machine according to claim 6, further comprising a conductive ring positioned between the winding of the stator and the housing.

9. The machine according to claim 6, further comprising a rotor and a separating liner positioned between the stator winding and the rotor.

10. The machine according to claim 1, further comprising at least one circuit forming a passage for the coolant around the winding.

11. The machine according claim 10, wherein the circuit comprises at least one fin configured to send a cooling gas towards a rotor of the machine.

12. The machine according to claim 1, wherein the housing forms an interior space of the machine, configured to be pressurized.

13. The machine according to claim 12, wherein the machine comprises an inner fan, which is positioned on a shaft of the machine or on a rotor, on one side of the stator and the rotor, in the interior space of the machine.

14. The machine according to claim 1, wherein the machine comprises a rotor forming an interior cooling circuit with at least one delivery passage and at least one return passage, through which a cooling gas can pass.

15. The machine according to claim 1, further comprising at least one end flange, or two end flanges, at least one flange comprising passages for the flow of a coolant.

16. The machine according to claim 15, wherein the end flange comprises the passages for the flow of a coolant, comprising a plate of material for redirecting a cooling gas coming from a delivery passage of a rotor towards the return passage of the rotor.

17. The machine according to claim 16, wherein the machine comprises a diffuser insert fastened to the end flange comprising the passages for the flow of a coolant, configured to guide the cooling gas coming from the delivery passage of the rotor towards a plate of material.

18. The machine according to claim 1, wherein the ducts comprise an inlet of the coolant towards the stator body and an outlet of the coolant.

19. The machine according to claim 1, wherein the portion is an integral part of the lateral wall of the housing.

20. A rotary electric machine, comprising:
 a stator housed in a housing, the stator comprising a stator body formed by a stack of stator laminations, the laminations being generally non-circular and being angularly offset with respect to each other, so as to form spaces with the housing, the housing comprising ducts for the flow of a coolant, and said spaces also being used for the flow of the coolant, wherein the ducts comprise at least a portion defined by a concavity on an internal surface of a lateral wall of the housing, the concavity forming a protrusion on an external surface of the housing, the protrusion being at least partially closed in a radial direction from an outside of the machine by the lateral wall of the housing.

21. The machine according to claim 20, wherein the ducts comprise an inlet of the coolant towards the stator body and an outlet of the coolant.

22. The machine according to claim 20, wherein the protrusion is an integral part of the lateral wall of the housing.

* * * * *